United States Patent [19]
Burnett et al.

[11] Patent Number: 5,220,944
[45] Date of Patent: Jun. 22, 1993

[54] DUAL BLEND DOOR ASSEMBLY

[75] Inventors: Leslie Burnett, Belleville; Daniel A. La Palm, Allen Park, both of Mich.; Anthony J. Pastoria, Studio City, Calif.

[73] Assignee: Ford Motor Company, Dearborn, Mich.

[21] Appl. No.: 913,492

[22] Filed: Jul. 14, 1992

[51] Int. Cl.$^5$ .............................................. F16K 11/14
[52] U.S. Cl. ........................... 137/630.14; 137/625.44; 137/630.15; 137/875
[58] Field of Search ...................... 137/630.14, 630.15, 137/625.44, 875

[56] References Cited

U.S. PATENT DOCUMENTS

| | | | |
|---|---|---|---|
| 709,262 | 9/1902 | Gold | 137/630.15 |
| 790,294 | 5/1905 | Gold | 137/630.15 X |
| 2,665,714 | 1/1954 | Greenwood | 137/630.14 X |
| 2,796,082 | 6/1957 | Green et al. | 137/630.15 |
| 2,835,183 | 5/1958 | Miller et al. | |
| 2,836,113 | 5/1958 | Seyfarth | |
| 2,879,799 | 3/1959 | Jansen et al. | 137/630.15 |
| 3,136,338 | 6/1964 | Hamer | 137/630.14 |
| 3,382,895 | 5/1968 | McCullough | 137/630.15 |
| 3,804,124 | 4/1974 | Finke et al. | 137/630.14 |
| 3,971,414 | 7/1976 | Illing | 137/630.15 |
| 4,067,359 | 1/1978 | Kwast | 137/630.14 |
| 4,355,753 | 10/1982 | Watanabe | 237/12.3 |
| 4,844,120 | 7/1989 | Myers | 137/601 |

FOREIGN PATENT DOCUMENTS 2015065 10/1970 Fed. Rep. of Germany .
2604432  8/1977 Fed. Rep. of Germany .

*Primary Examiner*—Gerald A. Michalsky
*Attorney, Agent, or Firm*—Roger L. May; Raymond L. Coppiellie

[57] ABSTRACT

A dual blend door for a motor vehicle climate control system allows operation of the door within an air passage with lesser effort and thus may be operated by a smaller and more efficient mechanism. The dual blend door provides a main door within which is an opening covered by a smaller inner door. Both the main door and the inner door are coaxially mounted on the same pivot shaft and pivoting of the shaft first opens the inner door, relieving the air pressure exerted upon the main door. Continued pivoting of the pivot shaft beyond a predetermined angle engages drive means comprising cooperating elements of the inner door and main door to open the main door subsequent to the opening of the inner door. In broader applications, the invention constitutes a fluid passage door assembly for controlling the flow of fluid through a passage.

21 Claims, 3 Drawing Sheets

DUAL BLEND DOOR ASSEMBLY

TECHNICAL FIELD

The present invention is directed to a fluid passage door assembly having a main door and having a smaller, inner door within the main door, which inner door is capable of being selectively opened by itself or in combination with the main door. More particularly, the present invention is directed to a dual blend door assembly for a motor vehicle climate control system having a main door and an inner door of the type stated above.

BACKGROUND ART

Passage doors for motor vehicle climate control systems have long been used to direct the flow of air through various passages of the climate control system as selected to achieve a specific climate state. As the popularity of vans and other vehicles with larger-than-standard passenger compartments has grown, there has been a concomitant use of larger air passages within the climate control system to accommodate larger air flow through the system in order to more efficiently control the climate of the larger passenger compartment. As the size and the cross-sectional area of the air passages increases, however, it takes more effort to move the door controlling flow through that passage, since the fluid pressure against which the door operates also increases with the increase in cross-sectional area.

The present invention eliminates the need to provide bigger, heavier, and more expensive mechanisms to open the door against the greater force caused by air pressure present in larger passages by providing a dual door assembly. In the dual blend door assembly of the present invention, the main door which controls the flow of fluid through a passage of the motor vehicle climate control system is provided with a smaller, inner door within the main door. The invention provides means to open the smaller, inner door, thus uncovering an opening within the main door, prior to attempting to move the larger main door itself. Since the cross-sectional area of the inner door is necessarily smaller than the cross-sectional area of the main door, the force against which the inner door operates is smaller than the force on the entire door assembly and less effort must be exerted by a control system to open this inner door. Of course, once the inner door exposes the opening within the main door, air pressure on either side of the main door begins to equalize and less effort is then needed to open the main door itself. By this operation, the present invention allows opening of the door assembly with less effort than would be required to open a unitary door, thus allowing more efficient operation of the door assembly. Additionally, the coaxial relationship between the inner door and the main door provides a more simple and efficient design of this dual blend door assembly.

In contrast, the flap valve of German Patent No. 2,015,065 discloses an auxiliary flap 4 which is located in the center of main flap 3, and is thus not coaxial therewith. As a result, the flap valve of German Patent 2,015,065 is provided with an actuating arm 6 which opens auxiliary flap 4 in a direction perpendicular from the plane of main flap 3, with subsequent continued retraction of the auxiliary flap 4 by the actuating arm eventually pivoting main flap 3 around pivot shaft 5. Further, this German patent is not intended for a motor vehicle climate control system and is, therefore, of minor relevance to claims of the present invention directed to a dual blend door assembly for such a motor vehicle climate control system.

German Patent 2,604,432 discloses a two-part butterfly valve in which the two moving portions are mounted along side each other rather than providing a design similar to the present invention in which a moving inner door is mounted within the larger, moving main door, with both the main door and inner door being mounted coaxially and substantially coextensively with a pivot shaft.

SUMMARY OF THE INVENTION

It is an object of the present invention to provide a fluid passage door assembly which allows operation of the door against relatively high fluid pressure with minimal effort by providing a main door having a smaller, inner door within the main door and by opening the inner door to expose a relief opening in the main door, prior to moving the main door.

Another object of the present invention is to provide a dual blend door assembly for a motor vehicle climate control system in which a smaller, inner door located within a main door, is first opened before operating the main door against the air pressure bearing thereon. It is an additional object of the present invention to provide a dual blend door assembly which allows the motor vehicle climate control system to selectively divert a portion of air flow through a conditioning unit to provide selective blends of conditioned air with ambient air within the passenger compartment of the motor vehicle.

In a preferred embodiment, this invention provides a fluid passage door assembly having a pivot shaft, a main door which includes a closed area and an opening, the main door being pivotally hinged to the shaft, and an inner door fixed to the shaft and coaxial with the main door and generally coextensive with the opening in the main door. The inner door pivots with the pivot shaft to move from a first position in which the inner door closes the opening in the main door, and the second position in which the inner door is displaced from the main door to expose the opening in the main door. Subsequent continued pivoting of the shaft through a predetermined angle subsequently operates to open the main door.

When applied to a motor vehicle climate control system, the present invention provides a dual blend door assembly having a generally planar pivotable main door which defines a relief opening and defines a closed portion. The assembly also includes a pivotable inner door which is generally coextensive with the relief opening and is pivotable relative to the main door for movement between a first position in which the inner door is generally coplanar with the main door, simultaneously closing the relief opening, and a second position pivotally displaced from the main door in which the relief opening is exposed. The assembly also includes a pivot shaft to which both main door and inner door are coaxially and pivotally attached. Finally, the dual blend door assembly also includes a pivot or drive means for pivoting the inner door to open the relief opening in the main door before pivoting the main door itself. In a preferred embodiment for the dual blend door assembly for a motor vehicle climate control system, the pivot or drive means includes a drive surface located at an end of the inner door near the pivot shaft and the bearing surface located at the end of the main door near the pivot shaft, with the bearing surface being circumferentially spaced about the pivot shaft, from said drive surface, by a predetermined angle.

The invention, together with additional features, objects and advantages thereof, is best understood by reference to the following description, when taken in connection with the accompanying illustrative drawings.

BEST MODE FOR CARRYING OUT THE INVENTION

Figure 1:
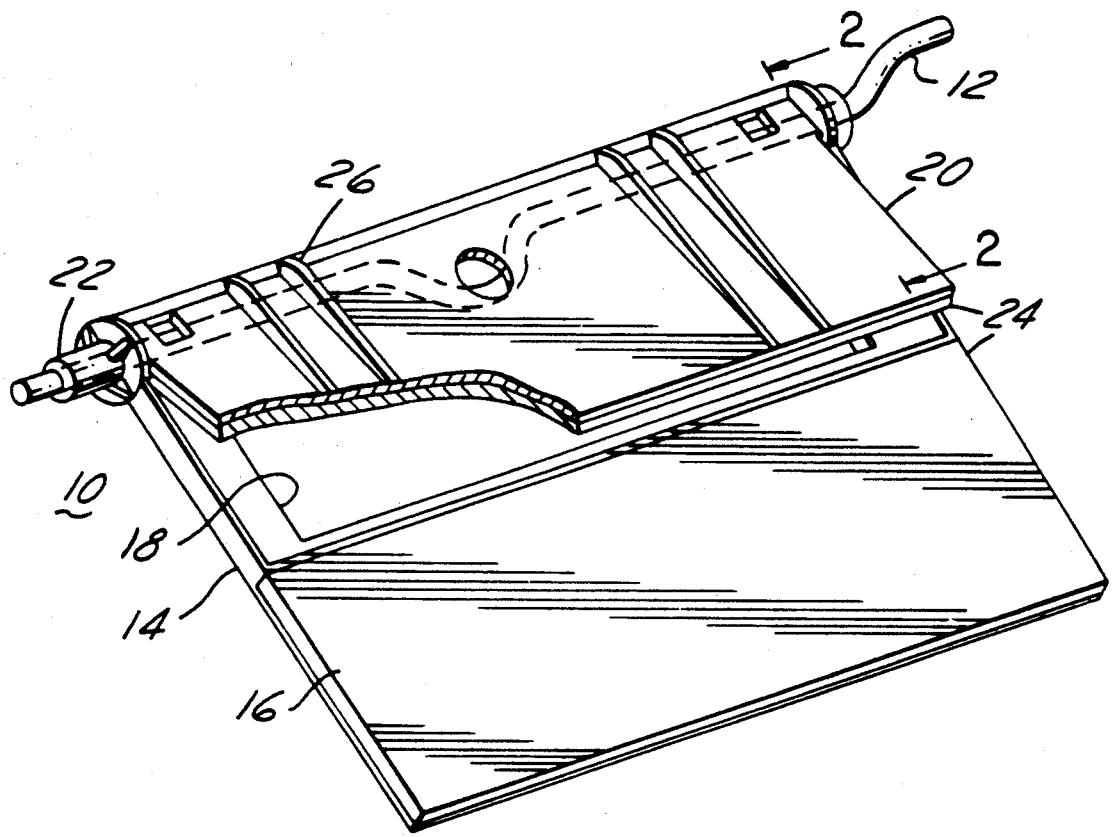
FIG. 1 is an elevated perspective view of the fluid passage door assembly of the present invention, including a section of the inner door cut away to show the relief opening of the main door.

FIG. 1 shows a preferred embodiment of a fluid passage door assembly of the present invention which controls the flow of fluid through a passage. As seen, a fluid passage door assembly 10 comprises a pivot shaft 12 and a main door 14 which includes a closed portion 16 and a relief opening 18. Door assembly 10 also comprises an inner door 20 which is generally coextensive with relief opening 18.

Main door 14 is pivotally hinged to pivot shaft 12 at one end of main door 14 by the simple expedient of passing pivot shaft through an opening at the end of main door 14. A sleeve 22 may assist to retain main door 14 in a proper operating position within a fluid passage 14 by appropriately filling the space in the passage between those elements which receive the pivot shaft. The sleeve 22 may be formed, in appropriate dimension, either integrally with main door 14 or as a separate element mounted upon pivot shaft 12.

As shown in broken lines in FIG. 1, pivot shaft 12 is a "shepherd's crook" shaft, having a crook in the area about half way along the length of inner door 20. Inner door 20 is fixed to pivot shaft 12 by any of various appropriate means known to the art, such as by use of clips which may be disposed on the inner door at its sides and middle which may fixedly mount inner door 20 to shaft 12. It should be appreciated that both main door 14 and inner door 20 are thus coaxially coupled to pivot shaft 12.

Both main door 14 and inner door 20 may be provided with seals 24 to improve the quality of the seal of those doors with the respective openings which they are intended to close. In the case of main door 14, seals 24 may be provided at the periphery of both sides of the door, including closed portion 16 since main door 14 must seal against respective portions of the fluid passage in both fully opened and fully closed positions. Inner door 20 is provided with a seal 24 on that side of inner door 20 which seats against that portion of main door 14 which defines relief opening 18. In a preferred embodiment, seal 24 may be a polyurethane foam of appropriate density, although other appropriate sealing means are well known to the art.

Likewise, main door 14 and inner door 20 may be formed of any of many appropriate materials known to the art, with preferable materials tending to be relatively lightweight in keeping with the objective of the invention to minimize the amount of effort needed to move main door 14 and inner door 20. In a preferred embodiment, main door 14 and inner door 20 are formed of a polystyrene molding compound. Further, inner door 20 may be provided with appropriately positioned reinforcement ribs 26 for greater structural support.

Figure 2:
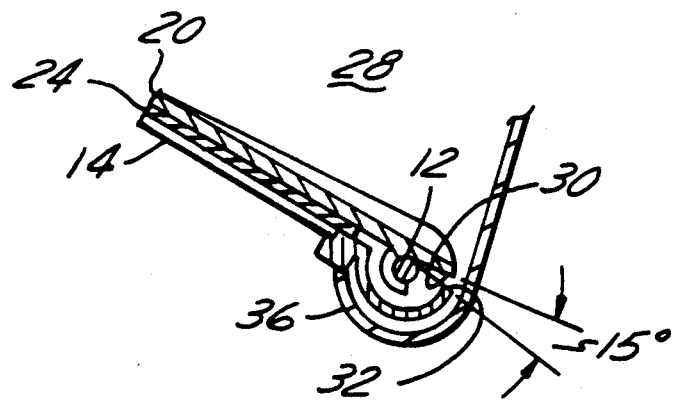
FIG. 2 is a side view of the drive means for pivoting the inner door before pivoting of the main door taken along the line 2—2 of FIG. 1, with the inner door generally coplanar with the main door.

The door assembly 10 of the present invention also includes pivot or drive means 28 for pivoting the inner door 20 to open relief opening 18 before pivoting main door 14. In a preferred embodiment illustrated in FIG. 2, pivot or drive means 28 comprises the pivot shaft 12, and a drive surface 30 located at an end of inner door 20. It will be recalled that inner door 20 is fixed to pivot shaft 12. Drive means 28 also comprises a bearing surface 32 located at an end of main door 14 proximal to shaft 12. Preferably, both drive surface 30 and bearing surface 32 extend substantially along the length of pivot shaft 12. As shown in FIG. 2, bearing surface 32 is circumferentially spaced about pivot shaft 12 from drive surface 30 by a predetermined angle, which in this case is shown to be 15°. Since inner door 20 is fixed to pivot shaft 12 and main door 14 is pivotable relative to pivot shaft 12, the pivoting of pivot shaft 12 will effect concomitant pivoting of inner door 20.

As will be more fully explained below in connection with FIGS. 3 through 6, inner door 20 will first pivot through the predetermined angle, which in FIG. 2 is 15°, thus displacing inner door 20 from a first position in which it is generally coplanar with main door 14 and in which it closes relief opening 18. It is seen that the pivotal displacement of inner door 20 from this first position to a second position opens relief opening 18 up to this predetermined angle without causing main door 14 to pivot around pivot axis 12. Continued pivoting of pivot shaft 12 past the predetermined angle causes drive surface 30 at the end of inner door 20 to engage bearing surface 32 at the end of main door 14 thus pivoting main door, 14 from its starting position.

It will be appreciated by those skilled in the art that alternative pivot means or drive means 28 known to the art may also serve to allow inner door 20 to be pivotally displaced from a first position in which it is coplanar with main door 14 before main door 14 itself pivots relative to pivot shaft 12. For example, one known alternative may be to affix a preselected length of a tensile member between the end of inner door 20 which is distal from pivot shaft 12 to the end of closed portion 16 of main door 14 which is most proximal to pivot shaft 12. The pivoting of inner door 20 with pivot shaft 12 would allow the opening of relief opening 18 for a radial distance equal to the length of the tensile member before causing main door 14 to be pivotally displaced from its starting position.

Figure 3:
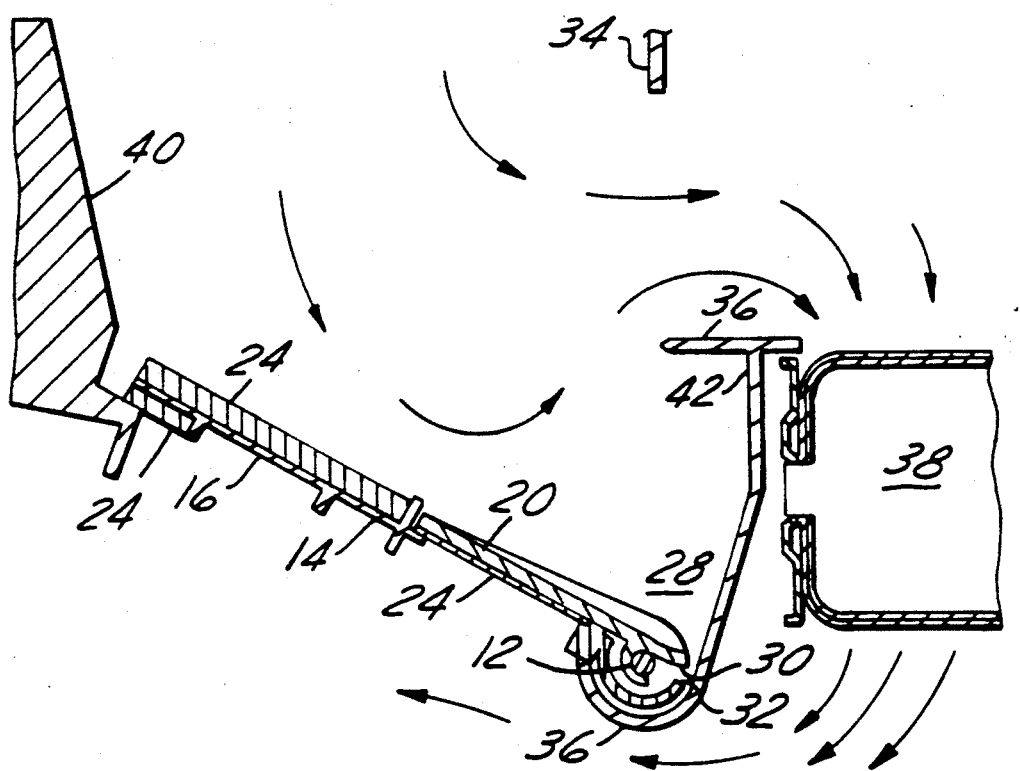
FIG. 3 is a sectional view of the dual blend door assembly of the present invention shown in place within a passage of a motor vehicle climate control system, illustrating the operation of the door assembly in a first, fully closed position.

When the fluid passage door assembly 10 of the present invention is adapted to a specific application within a motor vehicle climate control system, it may be more appropriately referred to as a dual blend door assembly 10, and FIGS. 3 through 6 show such a dual blend door assembly 10 within the context of a motor vehicle climate control system. As shown in FIG. 3, dual blend door assembly 10 forces air through a passage between a first wall 34 and a second wall 36, and through conditioning unit 38 of the climate control system, by closing off an ambient air passage between second wall 36 and a third wall 40. In this position, all air passing downstream in the climate control system as passed through conditioning unit 38, which may be either a heater core or an evaporator core. It will be appreciated from FIG. 3 by those skilled in the art that the opening of a conventional unitary door of the same size as dual blend door assembly 10 will require a force which is proportional to the cross-sectional area of that entire unitary conventional door.

Figure 4:
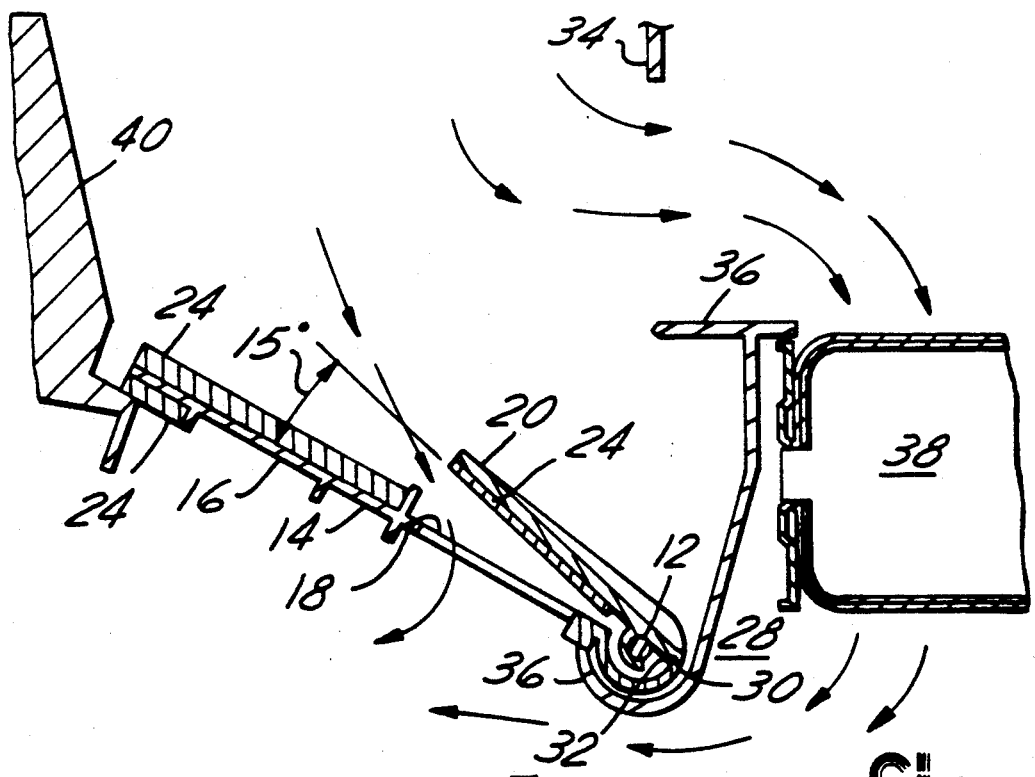
FIG. 4 is a sectional view of the dual blend door assembly in position within a motor vehicle climate control system, illustrating the operation of the door assembly when the inner door has been opened.

FIG. 4 shows the operation of the dual blend door assembly 10 of the present invention when pivot shaft 12 has been pivoted, with concurrent pivoting of inner door 20 which is pivotally fixed to shaft 12. More specifically, FIG. 4 shows the operation of dual blend door assembly 10 when inner door 20 has been pivoted up to the predetermined angle which separates the drive surface 30 on inner door 20 on the circumferentially spaced bearing surface 32 on main door 14. In this example, that predetermined angle is 15° and the pivotal displacement of inner door 20 from a first position in which it is coplanar with main door 14 opens relief opening 18, allowing a portion of ambient air to pass through opening 18. At the same time, a portion of ambient air still passes through the conditioning passage defined between first wall 34 and second wall 36. It is thus seen that the resulting air passing downstream is a blend of ambient air passing through relief opening 18 with air which has passed through conditioning unit 38.

It will be appreciated by those skilled in the art that the force required to move inner door 20 to a second position in which it is pivotally displaced from the plane of main door 14 requires less effort than would be required to move a unitary conventional door of the same size as door assembly 10. This is true because the air pressure against which inner door 20 must move in order to open relief opening 18 is proportional to the smaller cross-sectional area of inner door 20 and not to the overall cross-sectional area of door assembly 10.

Figure 5:
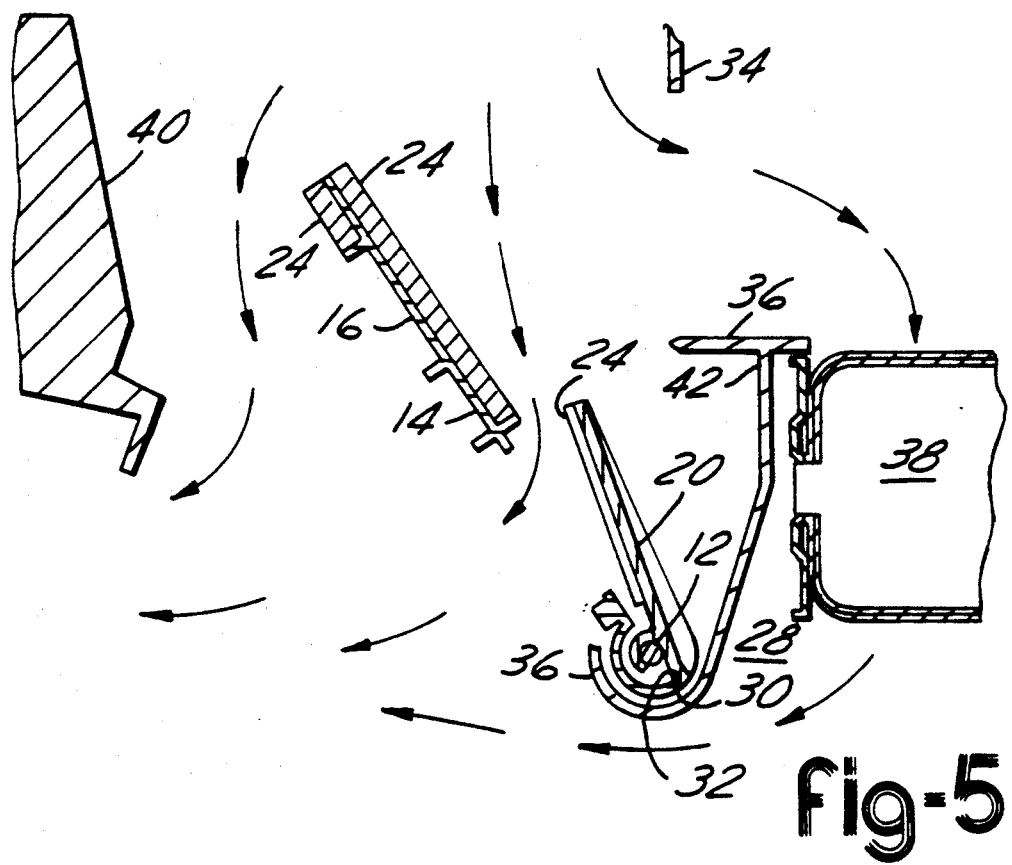
FIG. 5 is a sectional view of the dual blend door assembly in position within a motor vehicle climate control system, illustrating the operation of the door when the inner door has been opened and the main door has been partially opened.

FIG. 5 illustrates the operation of dual blend door assembly 10 when pivot shaft 12 has been pivoted beyond the predetermined angle which circumferentially spaces drive surface 30 from bearing surface 32. As pivot shaft 12 pivots through this predetermined angle, drive surface 30 engages bearing surface 32 and pivots main door 14 away from the first, fully closed position in which it has been seated against a portion of third wall 40. In this intermediate position, in which main door 14 is intermediate between seating against first wall 34 and seating against third wall 40, a portion of ambient air passes between main door 14 and third wall 40, another portion of air passes through relief opening 18 and a final portion of air passes through the conditioning passage defined by first wall 34 and second wall 36, directing air through conditioning unit 38. Thus, the final blend of air which passes downstream in the climate control system is a blend of air which has a larger component of ambient air and a smaller component of conditioned air than that which passed downstream in FIG. 4. Obviously, other intermediate positions will vary the space between main door 14 and third wall 40 and thus will control the amount of ambient air which blends with conditioned air in passing downstream in the climate control system, allowing the system to achieve any desired blend of ambient air with conditioned air.

It will be appreciated by those skilled in the art that the amount of effort required to pivot main door 14 away from third wall 40, as shown in FIG. 5, is less than would be required to open a conventional, unitary door of the same size since inner door 20 has already been pivoted to expose relief opening 18 as was shown in FIG. 4. Less effort is required to pivot main door 14 because the opening of relief opening 18 has already served to begin equalizing pressure on both sides of main door 14 and also because the cross-sectional area of closed portion 16 of main door 14 against which the air pressure operates is less than the cross-sectional area of a unitary, conventional door of the same size as door assembly 10.

Figure 6:
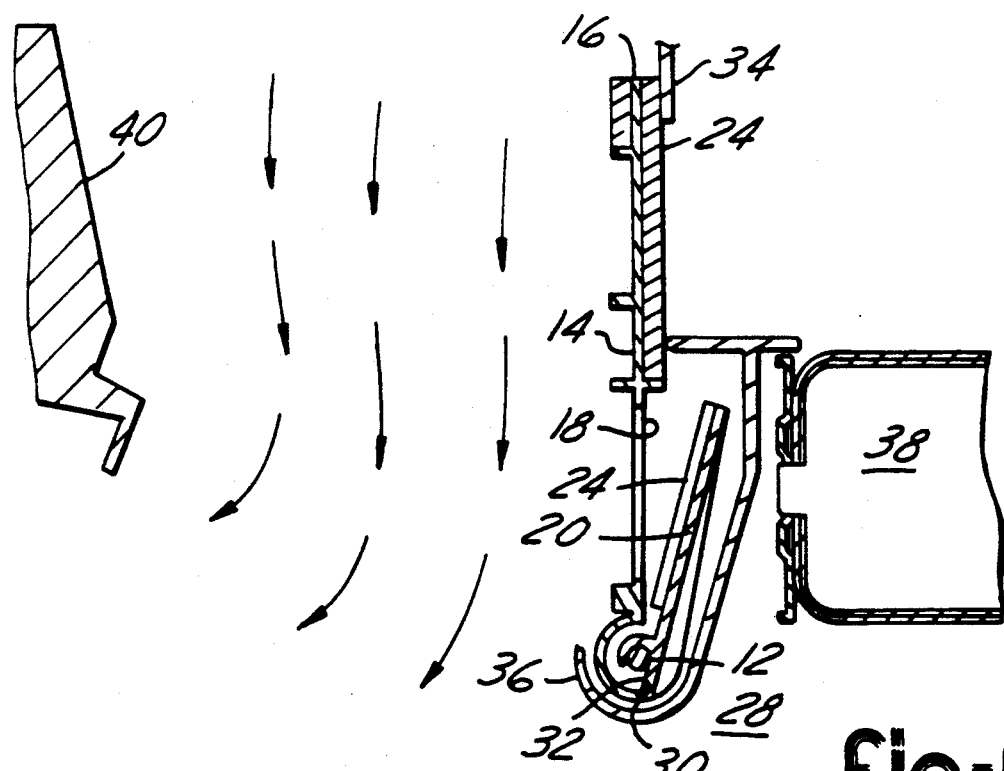
FIG. 6 is a sectional view of the dual blend door assembly showing the operation of the door when in a fully opened position.

Finally, FIG. 6 illustrates the operation of dual blend door assembly 10 when fully opening the ambient air passage defined by second wall 36 and third wall 40. In this position, main door 14 closes off the conditioning passage defined by first wall 34 and second wall 36 preventing any air from passing through conditioning unit 38 so that only ambient air passes downstream. It is seen that seal 24 on the closed portion 16 of main door 14 bears against portions of first wall 34 and second wall 36 to better seal this passage from ambient air. It should also be noted that second wall 36 has been provided with a recessed chamber 42 to accommodate the pivotal displacement of inner door 20 from the plane of main door 14 as pivot shaft 12 has continued to pivot into the full ambient air position.

It should be noted that control means for controlling the pivoting of pivot shaft 12 are well known to the art and any appropriate control means may be used within the present invention. A preferred embodiment of the invention may use a control means for controlling the pivoting of pivot shaft 12 which includes a bell crank attached to an end of shaft 12 at an appropriate distance from door assembly 10.

While the best mode for carrying out the invention has been described in detail, those familiar with the art to which this invention relates will recognize various alternative designs and embodiments for practicing the invention as defined by the following claims.

We claim:

1. A fluid passage door assembly for controlling the flow of fluid through said passage, said door assembly comprising:
   a pivot shaft;
   a main door having a closed portion and an opening, said main door pivotally hinged directly to said pivot shaft;
   an inner door fixed to said pivot shaft coaxially with said main door, said inner door pivotable with said pivot shaft to move from a first position generally coextensive with said opening and a second position pivotally displaced from said main door, and
   pivot means, including said pivot shaft, for pivoting said main door after said inner door has been pivoted beyond said second position.

2. The fluid passage door assembly of claim 1 wherein said pivot means further comprises:
   a drive surface located at an end of said inner door proximal to said pivot shaft;
   a bearing surface located at an end of said main door proximal to said pivot shaft, said bearing surface circumferentially spaced about said pivot shaft from said drive surface by a predetermined angle, said drive surface engaging said bearing surface for pivoting said main door after said inner door has been pivoted beyond said second position.

3. The fluid passage door assembly of claim 2 further comprising pivot shaft control means for controlling the pivoting of said pivot shaft.

4. The fluid passage door assembly of claim 1 further comprising pivot shaft control means for controlling the pivoting of said pivot shaft.

5. A dual blend door assembly for a motor vehicle climate control system, said door assembly comprising:
   a generally planar pivotable main door defining a relief opening and defining a closed portion;
   a pivotable inner door generally coextensive with said relief opening and pivotable relative to said main door for movement between a first portion generally coplanar with said main door and a second position pivotally displaced from said main door whereby said inner door may open and close said relief opening;
   a pivot shaft about which both said main door and said inner door pivot, said main door pivotally hinged directly to said pivot shaft and said inner door directly fixed to said pivot shaft.

6. The dual blend door assembly of claim 5 further comprising:
   drive means, including said pivot shaft, for pivoting said inner door to open said relief opening before pivoting said main door.

7. The dual blend door assembly of claim 6 wherein said drive means comprises:
   a drive surface located at an end of said inner door proximal to said pivot shaft;
   a bearing surface located at an end of said main door proximal to said pivot shaft, said bearing surface circumferentially spaced about said pivot shaft from said drive surface by a predetermined angle.

8. The dual blend door assembly of claim 7 further comprising pivot shaft control means for controlling the pivoting of said pivot shaft.

9. The dual blend door assembly of claim 6 further comprising pivot shaft control means for controlling the pivoting of said pivot shaft.

10. The dual blend door assembly of claim 5 further comprising pivot shaft control means for controlling the pivoting of said pivot shaft.

11. A dual blend door assembly for a motor vehicle climate control system having a bypass air passage and a conditioning air passage, said door assembly comprising:
   a generally planar pivotable main door defining a relief opening and defining a closed portion;
   a pivotable inner door generally coextensive with said relief opening and pivotally connected to said main door for movement between a first position generally coplanar with said main door and a second position pivotally displaced from said main door whereby said inner door may open and close said relief opening;
   a pivot shaft about which both said main door and said inner door pivot, said main door pivotally hinged directly to said pivot shaft and said inner door directly fixed to said pivot shaft; and
   drive means, including said pivot shaft, for pivoting said inner door to open said relief opening before pivoting said main door;
   whereby air is directed through said conditioning air passage when said inner door is in said first position and at least some air is directed through said bypass air passage when said inner door is in said second position for selective blending of said conditioned air and said bypass air.

12. The dual blend door assembly of claim 11 wherein said drive means further comprises:
   a drive surface located at an end of said inner door proximal to said pivot shaft;
   a bearing surface located at an end of said main door proximal to said pivot shaft, said bearing surface circumferentially spaced about said pivot shaft from said drive surface by a predetermined angle.

13. The dual blend door assembly of claim 11 further comprising pivot shaft control means for controlling the pivoting of said pivot shaft.

14. The dual blend door assembly of claim 11 wherein said main door is pivotally attached directly to said pivot shaft and said inner door is fixed to said pivot shaft and pivotable therewith.

15. The dual blend door assembly of claim 14 wherein said drive means further comprises:
   a drive surface located at an end of said inner door proximal to said pivot shaft;
   a bearing surface located at an end of said main door proximal to said pivot shaft, said bearing surface circumferentially spaced about said pivot shaft from said drive surface by a predetermined angle.

16. The dual blend door assembly of claim 15 further comprising pivot shaft control means for controlling the pivoting of said pivot shaft.

17. The dual blend door assembly of claim 14 further comprising pivot shaft control means for controlling the pivoting of said pivot shaft.

18. A climate control system having a bypass air passage and a conditioned air passage; and
   a door assembly for dividing said bypass air into two bypass air portions, said door assembly comprising:
   a generally planar pivotable main door defining a relief opening and defining a closed portion;
   a pivotable inner door generally coextensive with said relief opening and pivotally connected to said main door for movement between a first position generally coplanar with said main door and a second position pivotally displaced from said main door whereby said inner door may open and close said relief opening; and
   a pivot shaft about which both said main door and said inner door pivot, said main door pivotally hinged directly to said pivot shaft and said inner door directly fixed to said pivot shaft;
   whereby air is directed through said conditioning air passage when said inner door is in said first position, and at least one bypass air portion is directed to said bypass air passage when said inner door is in said second position, and at least some air is directed through both bypass air portions when said inner door is pivoted beyond said second position.

19. The climate control system of claim 18 wherein said door assembly further comprises drive means, including said pivot shaft, for pivoting said inner door to open said relief opening before pivoting said main door.

20. The climate control system of claim 19 wherein said drive means comprises:
   a drive surface located at an end of said inner door proximal to said pivot shaft; and
   a bearing surface located at an end of said main door proximal to said pivot shaft, said bearing surface circumferentially spaced about said pivot shaft from said drive surface by a predetermined angle.

21. The climate control system of claim 20 wherein said door assembly further comprises pivot shaft control means for controlling the pivoting of said pivot shaft.

* * * * *